3,701,713
SOLVENT REMOVAL FROM MICRO-ORGANISMS
Ian Cameron Bennett, Pinner, England, and Jean Amaudric du Chaffaut, Marseille, France, assignors to The British Petroleum Company Limited, London, England
Filed Oct. 16, 1969, Ser. No. 866,840
Claims priority, application Great Britain, Oct. 18, 1968, 49,547/68
Int. Cl. C12b *1/00*
U.S. Cl. 195—28 R        4 Claims

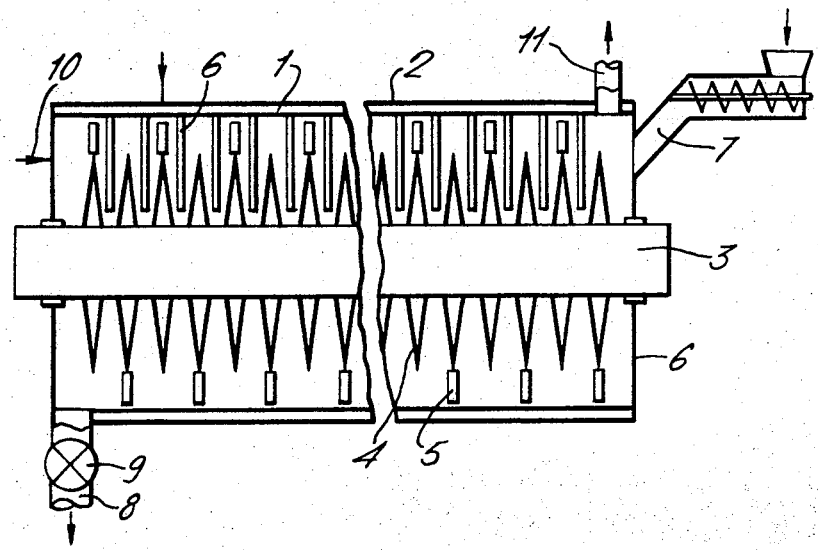

ABSTRACT OF THE DISCLOSURE

A method for removing solvent from a micro-organism containing fermentation product which has been produced by cultivating a micro-organism in the presence of a hydrocarbon and subjecting the cultivated micro-organism to a solvent extraction treatment to remove residual hydrocarbon. The method consisting essentially of passing steam over the heated fermentation product in such a manner as to maintain in the product a certain minimum water content whilst the solvent is being removed.

---

The present invention relates to a process for the removal of solvents from fermentation products consisting essentially of micro-organisms.

In particular in fermentation processes for the cultivation of micro-organisms on hydrocarbons as a consumable carbon source the cultivated micro-organism containing biomass may be treated with solvents to remove traces of residual hydrocarbons. The solvent, usually consisting of or containing an alcohol, can be removed from the biomass by evaporation for example under reduced pressure. It has been found that removal of the solvent can be improved by maintaining a certain minimum quantity of water in association with the micro-organism during the solvent removal treatment, namely at least 20% by weight of water in relation to the weight of micro-organism in the "dry state" as defined hereinafter.

It is an object of the present invention to provide an improved process and apparatus for the removal of solvent from biomass.

According to the present invention there is provided a process for the removal of solvent from fermentation products consisting essentially of micro-organisms which process comprises contacting a biomass, containing a solvent consisting of or containing an alcohol, with moving heated surfaces while continuously feeding biomass into contact with said surfaces, moving biomass transversely with respect to the heated surfaces and withdrawing biomass from contact with the surfaces, the biomass being maintained in an atmosphere consisting of a vapour phase consisting of or containing steam with vapour of the alcohol; steam being introduced continuously, said vapour phase moving co-currently or counter-currently to the moving biomass, the rate of introduction of steam being at least sufficient to ensure that, under the conditions of drying employed, substantially all of the solvent is removed from the biomass being treated.

Preferably the biomass is contained in a horizontal trough and is contacted with heated rotating discs mounted on a rotated horizontal shaft.

Preferably the discs are hollow and are heated by a heating medium circulated through the shaft.

Preferably the alcohol is ethanol or isopropanol.

The biomass to be treated may be in the "dry state" by which we mean the micro-organism product obtained by drying at 120° C. Most suitably the biomass may contain some water in association with the micro-organism. Preferably the amount of water association with the micro-organism should be about 20% by weight in relation to the weight of the micro-organism in the "dry state."

The biomass may be obtained by continuously cultivating a micro-organism in the presence of an aqueous nutrient medium, a hydrocarbon substrate and a free oxygen-containing gas, said micro-organism being of a strain which consumes said hydrocarbon, recovering a biomass consisting of or containing the micro-organism contaminated with hydrocarbon, solvent extracting the biomass with a solvent consisting of or containing an alcohol, recovering a biomass containing said solvent.

Preferably the hydrocarbo substrate consists at least in part of a straight chain hydrocarbon. Usually the straight-chain hydrocarbons will be those present in petroleum feedstocks as paraffins; however, the straight chain hydrocarbons may be present as olefins; also there may be used a mixture containing straight chain paraffins and olefins. Suitable petroleum feedstocks include kerosine, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–4% by weight of straight chain hydrocarbons.

Micro-organisms which are cultivated as herein described may be yeasts, moulds or bacteria. Within the term "micro-organism" used herein we include mixtures of micro-organisms. The preferred micro-organisms are yeasts.

Preferred yeast strains are as follows:

*Candida brumptii*
*Candida cantenulata*
*Candida clausenii*
*Candida humicola*
*Candida intermedia*
*Candida krusei*
*Candida lipolytica* (CBS No. 2078, No. 599; CMI No. 93743)
*Candida melibiosi* (NCYC No. 376, No. 153; CMI No. 83350, NCYC No. 458)
*Candida parapsilosis*
*Candida pulcherrima*
*Candida rugosa*
*Candida stellatoidea*
*Candida tropicalis* (NCYC No. 4)
*Candida utilis* (CMI No. 2331)
*Debaryomyces kloeckeri*
*Hansenula anomala*
*Pichia guilliermondii* (CBS No. 2084, No. 2031)
*Rhodotorula glutinis*
*Torulopsis famata*
*Torulopsis magnoliae*

The reference letters CBS refer to culture held by the Central Bureau voer Scherinelcultures, Baarn; CMI to the Commonwealth Mycological Institute, Kew, England and NCY to the National Collection of Yeast Cultures Nutfield, England.

Of the above *Candida lipolytica* and *C. tropicalis* are particularly preferred.

Preferably during cultivation of the micro-organism the aqueous nutrient medium is maintained at a desired pH by stepwise or continuous addition of an aqueous medium of high pH value. Usually, when using moulds or yeasts and in particular when using *Candida lipolytica*, the pH of the nutrient medium will be maintained in the range 3–6 and preferably in the range 4–5. (Bacteria require a higher pH usually 6.5–8.) Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using *Candida lipolytica* the preferred temperature range is 28–32° C.

The take-up of oxygen is essential for the growth of the micro-organism. The oxygen will usually be provided as air. In order to maintain a rapid rate of growth, the air, used to provide oxygen, should be present in the form of fine bubbles under the action of stirring. The air may be introduced through a sintered surface. However there may be used the system of intimate aeration known as "vortex aeration."

The product from the fermenter is preferably decanted under conditions such that a major proportion of the aqueous nutrient medium is removed.

Preferably the fraction containing the micro-organism is subjected to treatment with an aqueous treating medium containing a surface active agent.

Preferably the micro-organism fraction is vigorously mixed with the aqueous surface-active agent, and, without a further period of growth of the micro-organism, is subjected to further separation, preferably by centrifuging, to recover a micro-organism fraction and a spent aqueous phase containing hydrocarbon impurities removed from the micro-organism. If necessary, the washing and separating steps may be repeated, once or more, using an aqueous surface-active agent in the washing stage. After washing with surface active agent it is optional to wash with an aqueous medium which is free of surface active agent; preferably this medium will be water. Again if desired, a series of washing and separation stages may be employed.

Preferably the washing stages are carried out until the hydrocarbon content of the micro-organism is less than 7% based on the weight of the micro-organism (as calculated for the dry state). Preferably said content of hydrocarbons will be less than 5%.

The recovered fraction containing the micro-organism, or dried micro-organism obtained therefrom, is subjected to solvent extraction for the removal of traces of hydrocarbon.

The present invention is further described with reference to an embodiment illustrated in the accompanying drawing which shows a longitudinal section of an apparatus for removing solvent from contaminated biomass.

The apparatus consists of a horizontal cylindrical drum 1 having a length of 1.25 meters and an internal diameter of 0.5 meter. The drum has an external jacket 2 having a heating area of 1 square meter into which steam or other heating medium may be passed. A hollow rotatable shaft is axially located within the drum. This shaft 3 is equipped with spaced hollow discs 4 mounted in a plane normal to the shaft axis. Steam or other heating medium can be passed into the hollow shaft and discs which together provide a heating area of 4.5 square meters. Scrapers 5 are fitted at intervals on the periphery of each disc to prevent treated material from caking on the internal surface of the drum. The top internal surface of the drum is provided with a plurality of scraper blades 6 which project radially into the drum between the discs to prevent treated material from caking on the discs. An inlet 7 through which the material to be treated can be passed into the drum is provided near the top and at one end of the drum. An outlet 8 through which the treated material is passed out of the drum, is provided near the opposite lower corner of the drum. This outlet is controlled by rotary valve 9 which regulates the rate at which treated material leaves the drum. A steam inlet pipe 10 (schematically shown) is fitted at the top of the drum at the end opposite to the end having the inlet and a steam/vapour exit pipe 11 is located near the inlet. If desired the top surface of the drum and heating jacket may be recessed with a chamber having substantially rectangular cross section to provide a zone for the disengagement of steam/vapour from the solid treated material.

In operation of the apparatus 77.8 kilograms per hour of a biomass consisting of 45 percent by weight of dry matter, 43 percent by weight of isopropyl alcohol and 12 percent by weight of water was fed at a temperature of 75° C. into the drum through inlet 7. The biomass was obtained by cultivating a hydrocarbon consuming yeast on a hydrocarbon and aqueous nutrient medium; separating the yeast from the growth medium, and treating it with isopropanol to remove residual hydrocarbons. The feed rate was equivalent to 35 kilograms per hour of dry matter in the biomass. Saturated steam at a pressure of 1 kilogram per square centimeter gauge was supplied to the heating jacket, shaft and discs. The shaft was rotated at a speed of 30 revolutions per minute. Saturated steam at substantially atmospheric pressure was fed into the body of the drum through pipe 10 at the rate of 35 kilograms per hour. The treated biomass withdrawn from outlet 8 contained 0.4 percent by weight of alcohol and 22 percent by weight of water in relation to the weight of dry matter in the biomass.

By way of comparison biomass, the same composition as that previously described was passed into the drum at a temperature of 70° C. and a rate of 13 kilograms per hour (equivalent to 5.4 kilograms per hour of dry matter). The conditions of treatment were the same as those previously described with the exception that instead of passing steam into the drum steam pipe 10 was closed off and steam/vapour exit pipe 11 was connected to a fan to give, in operation, a slightly reduced pressure of about 5 centimeters of water within the cylinder. The treated biomass withdrawn from off take 8 contained 4.2 percent by weight of isopropyl alcohol and 5 percent of water in relation to the weight of dry matter.

What we claim is:

1. A process for the removal of solvent from a fermentation product consisting essentially of micro-organisms which comprises continuously feeding said fermentation product containing an alcoholic solvent into contact with heated rotating discs mounted on a horizontal shaft, maintaining an atmosphere containing steam and vaporized solvent around said product during removal of the solvent by continuously introducing saturated steam at a rate sufficient to provide for the presence of at least 20% water in said product based on the dry weight of micro-organism therein and continuously withdrawing said product from contact with said discs.

2. A process according to claim 1 in which the fermentation product is contained in a horizontal trough.

3. A process according to claim 1 in which the fermentation product is obtained by continuously cultivating a micro-organism in the presence of an aqueous nutrient medium; a hydrocarbon substrate and a free oxygen-containing gas, said micro-organism being of a strain which consumes said hydrocarbon, recovering a fermentation product containing the micro-organism contaminated with said hydrocarbon, solvent extracting the contaminated fermentation product with an alcoholic solvent and recovering a fermentation product containing said solvent.

4. A process according to claim 1 in which the solvent contains isopropanol.

References Cited

UNITED STATES PATENTS

| | | | |
|---|---|---|---|
| 3,522,147 | 7/1970 | Filosa | 195—28 |
| 2,618,560 | 11/1952 | Leslie | 34—33 X |

OTHER REFERENCES

Kirk-Othmer Encyclopedia of Chemical Technology, 2nd ed., 1969, vol. 18, John Wiley & Sons, pp. 549–564.

JOSEPH M. GOLIAN, Primary Examiner

U.S. Cl. X.R.

34—33, 37, 182; 195—105